(12) United States Patent
Jenner et al.

(10) Patent No.: US 6,898,147 B2
(45) Date of Patent: May 24, 2005

(54) SYSTEM FOR ESTIMATING AZIMUTHAL VARIATIONS IN SEISMIC DATA

(75) Inventors: Edward Louis Jenner, Golden, CO (US); Martin Carroll Williams, Boulder, CO (US)

(73) Assignee: Input/Output, Inc., Stafford, TX (US)

( * ) Notice: Subject to any disclaimer, the term of this patent is extended or adjusted under 35 U.S.C. 154(b) by 0 days.

(21) Appl. No.: 10/689,423

(22) Filed: Oct. 20, 2003

(65) Prior Publication Data

US 2004/0109387 A1 Jun. 10, 2004

Related U.S. Application Data

(62) Division of application No. 09/855,925, filed on May 15, 2001, now Pat. No. 6,681,184.

(51) Int. Cl.⁷ .................................................. G01V 1/00
(52) U.S. Cl. ............................ 367/51; 367/40; 367/50
(58) Field of Search .............................. 367/27, 40, 46, 367/50, 51, 54, 57

(56) References Cited

U.S. PATENT DOCUMENTS

| | | | |
|---|---|---|---|
| 3,414,370 A | | 12/1968 | Baumgartner .................. 21/58 |
| 3,611,278 A | | 10/1971 | Guinzy ...................... 340/15.5 |
| 4,206,509 A | * | 6/1980 | Ruehle ......................... 367/42 |
| 4,570,246 A | * | 2/1986 | Herkenhoff et al. .......... 367/68 |
| 4,613,960 A | | 9/1986 | Hinkley et al. ............... 367/51 |
| 4,755,972 A | | 7/1988 | Hanson et al. ................ 367/75 |
| 4,779,237 A | * | 10/1988 | Bodine ......................... 367/47 |
| 4,970,696 A | | 11/1990 | Crews et al. ................. 367/15 |
| 5,258,960 A | | 11/1993 | Swan ........................... 367/38 |
| 5,508,973 A | | 4/1996 | Mallick et al. ............... 367/38 |
| 5,532,978 A | | 7/1996 | Corrigan ...................... 367/75 |
| 5,610,875 A | * | 3/1997 | Gaiser ......................... 367/75 |
| 5,737,220 A | | 4/1998 | Miller ....................... 364/421 |
| 5,764,516 A | * | 6/1998 | Thompson et al. ........... 702/17 |
| 5,933,789 A | * | 8/1999 | Byun et al. ................... 702/17 |
| 6,041,018 A | * | 3/2000 | Roche .......................... 367/46 |
| 6,061,301 A | | 5/2000 | Corrigan ....................... 367/75 |
| 6,263,284 B1 | * | 7/2001 | Crider et al. ................. 702/14 |

OTHER PUBLICATIONS

Andreas Ruger, "Variation of P–wave reflectivity with offest and azimuth in anisotropic media", May–Jun. 1998, Geophysics vol. 63, No. 3, pp. 935–947.*

Heloise B. Lynn et al.; *Relationship of P–wave seismic attributes, azimuthal anisotropy, and commerical gas pay in 3–D P–wave multiazimuth data, Rulison Field, Piceance Basin, Colorado*, Geophysics, vol. 64, No. 4 (Jul.–Aug. 1999); pp. 1293–1311, 15 Figs., 2 Tables.

Bjorn Ursin et al.; *Robust AVO analysis*, Geophysics, vol. 60, No. 2 (Mar.–Apr. 1995); pp. 317–326, 9 Figs., 3 Tables.

Andreas Rüger; *Variation of P–wave reflectivity with offset and azimuth in anisotropic media*, Geophysics vol. 53, No. 3 (May–Jun. 1998); pp. 935–947, 7 Figs., 4 Tables.

Robert E. Grimm et al.; *Detection and analysis of naturally fractured gas reservoirs: Multiazimuth seismic surveys in the Wind River basin, Wyoming*, Geophysics, vol. 64, No. 4 (Jul.–Aug. 1990), pp. 1277–1292, 12 Figs., 2 Tables.

Arcangelo G. Sena; *Seismic traveltime equations for azimuthally anisotropic and isotropic media: Estimation of invercal elastic properties*, Geophysics, vol. 56, No. 12 (Dec. 1991), pp. 2090–2101, 7 Figs., 9 Tables.

* cited by examiner

*Primary Examiner*—Thomas H. Tarcza
*Assistant Examiner*—Scott A. Hughes
(74) *Attorney, Agent, or Firm*—Madan, Mossman & Sriram, P.C.

(57) ABSTRACT

The invention comprises a system for processing seismic data to estimate time shift resulting from velocity anisotropy in the earth's subsurface. A gather of seismic data traces is formed and selected seismic data traces included in said gather within selected time windows are cross-correlated to estimate the time shift in the seismic data traces included in said gather resulting from velocity anisotropy in the earth's subsurface.

61 Claims, 7 Drawing Sheets

SYSTEM FOR ESTIMATING AZIMUTHAL VARIATIONS IN SEISMIC DATA

CROSS-REFERENCE TO RELATED APPLICATIONS

This application is a divisional of U.S. patent application Ser. No. 09/855,925 filed on May 15, 2001, now U.S. Pat. No. 6,681,184.

BACKGROUND OF THE INVENTION

1. Field of the Invention

This invention is related to seismic data processing. More specifically, the invention is related to a system for processing seismic data to detect azimuthal velocity variations.

2. Description of Related Art

Seismic surveys are routinely used in the search for oil and gas reservoirs in the earth's subsurface. Seismic surveys are performed by imparting acoustic energy into the earth, either at a land surface or in a marine environment, and then detecting the reflected and refracted acoustic energy. The delay time between the imparting of the acoustic energy wave at the source location and detection of the same wave at a receiver location indicates the depth of reflecting geological interfaces.

Until recently, only two-dimensional ("2D") seismic surveys were conducted, with the seismic source locations being collinear with a line of receivers. Recent advances in technology have enabled three-dimensional ("3D") seismic survey data to be gathered and analyzed. Typically, in 3D surveys arrays of seismic receivers are deployed which receive reflected acoustic energy imparted at varying locations that may be specifically selected to provide a rich assortment of azimuths for common midpoints.

A technique frequently used in seismic survey analysis is AVO analysis, which is the amplitude variation with offset, and is also referred to herein as amplitude variation with incidence angle. According to the AVO approach, attributes of a subsurface interface are determined both from the normal-incidence amplitude of reflected seismic energy, and also from the dependence of the detected seismic reflections on the angle of incidence of the seismic energy at a subsurface reflecting interface relative to the vertical. In conventional AVO analysis, multiple seismic traces having a common reflection point, commonly referred to as a common mid point or common depth point(CMP or CDP) gather, are collected. From the CMP (or CDP) gather, one may derive the amplitude R of a reflected seismic wave from an interface (i.e., the "target horizon") as a function of the angle of incidence θ from the normal according to the following relationship:

$$R(\theta) = A + B \sin^2 \theta.$$

In this case, the coefficient A is the zero-offset response (also referred to as the AVO intercept), while the coefficient B is referred to as the AVO slope, or gradient, as it is representative of the rate of change of amplitude with the square of the angle of incidence. Analysis of the AVO slope and intercept can provide indicators of interesting formations, from an oil and gas exploration standpoint. For example, variations in the A and B values from a theoretical A-versus-B trend line for the expected stratigraphic sequences can indicate the location of hydrocarbon reserves.

While simple models of subsurface geology assume azimuthal isotropy in the propagation of acoustic energy it has been observed that azimuthal anisotropy is in fact present in many survey regions, such that the velocity of acoustic energy depends upon the azimuth of the source-receiver path. If azimuthal anisotropy is present, the conventional normal moveout correction may not adequately align the seismic traces in the gather, which can result in degraded AVO analysis.

Normal moveout correction of the seismic data, both for offset-dependent delays and also for azimuthal anisotropy caused by the overburden, is therefore typically performed in producing stacked traces of improved signal-to-noise ratio for use in a 3D seismic survey. For example, U. S. Pat. No. 5,532,978 describes a method of deriving and applying azimuthal anisotropy corrections to seismic survey signals.

The detection of a preferred azimuthal direction at a reflecting interface can also provide important information regarding geological features. For example, a preferred azimuthal reflection direction can indicate the presence of aligned vertical fractures. For moderately far offsets (25°–35° incidence angles), the P-wave traveling in the plane wave parallel to aligned vertical fractures has a higher velocity than the P-wave traveling in the plane perpendicular to the fractures.

Traditionally, azimuthal velocity analysis has been performed using azimuth-sectored supergathers and picking semblance maxima at various azimuths. This reduces the problem to a series of 2-D solutions, rather than solving the complete 3-D solution. In some cases as few as two sectors may be chosen, perpendicular and parallel to the (average) principal axes of the azimuthal anisotropy. If more than two sectors are used, an ellipse is fitted to the picked velocities to give fast and slow velocity magnitudes and the azimuth of the fast velocity. These procedures suffer from several drawbacks:

Picking semblance, by hand, on azimuth sectored data is processor/interpreter dependent and extremely time consuming.

Semblance works well for data which do not show amplitude variation with offset ("AVO"), however, if the data contain significant AVO, particularly if there is a polarity reversal, semblance can fail. In this case automatic picking of semblance maxima will be erroneous.

If the subsurface has azimuthal velocity variation ("AVV") then this will appear as an offset-dependent static viewed on offset-sorted CMP gathers. This will reduce the effectiveness of any surface consistent statics solution, thus the azimuth-sectored supergathers will most likely be contaminated with statics. This will significantly degrade the semblance analysis and may result in several semblance maxima.

The semblance is based on giving the greatest stack power. However, for AVV analysis it is the actual subsurface velocity that is of interest, not simply the velocity that gives the best stack. For instance, if a higher amplitude occurs at a particular azimuth within the sector, then the velocity at that azimuth will be picked. In addition, if those high amplitudes are at the mid to near offsets and are contaminated with residual statics then a completely erroneous velocity could give the highest semblance.

Sectoring and partial stacking of the data means that it is extremely difficult to obtain error estimates. Not only is it difficult to attribute a picking error from picking semblance, but errors due to the acquisition geometry are not represented. In any analysis of this type it is important to compute the errors associated with the obtained results. For instance a weighted least squares approach has been used to compute the errors in a technique for inverting azimuthal variation of amplitude for shear wave data. It has also been observed that the reliability of the amplitude variation with azimuth analysis has been assessed by looking for an absence of the acquisition geometry being mirrored in the anisotropy maps.

It should be noted that the description of the invention which follows should not be construed as limiting the invention to the examples and preferred embodiments shown and described. Those skilled in the art to which this invention pertains will be able to devise variations of this invention within the scope of the appended claims.

SUMMARY OF THE INVENTION

The invention comprises a system for processing seismic data to estimate time shift resulting from velocity anisotropy in the earth's subsurface. A gather of seismic data traces is formed and selected seismic data traces included in said gather within selected time windows are cross-correlated to estimate the time shift in the seismic data traces included in said gather resulting from velocity anisotropy in the earth's subsurface.

DESCRIPTION OF PREFERRED EMBODIMENT

Figure 1:
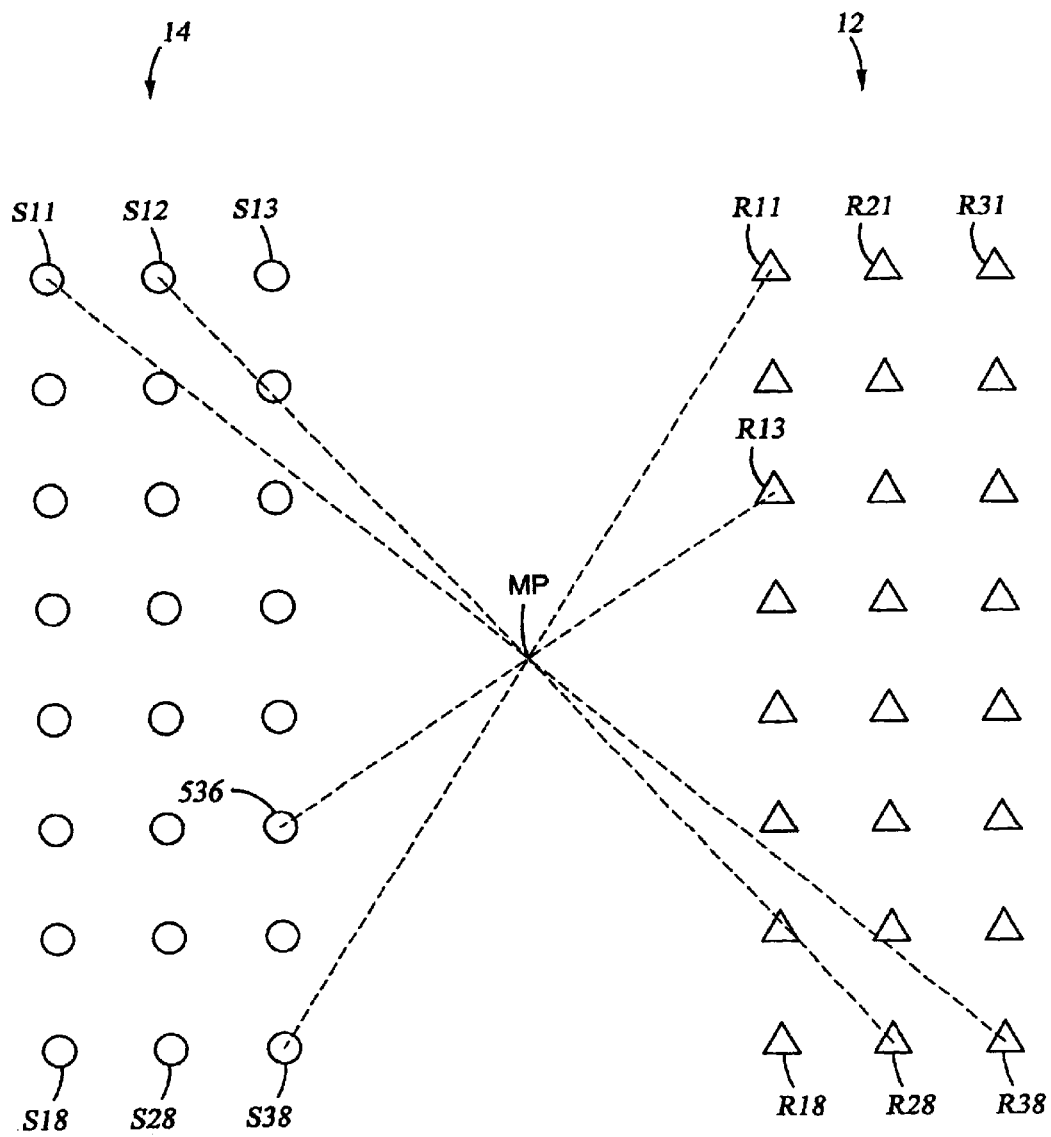
FIG. 1 shows a simplified portion of a 3D seismic source-receiver layout for a 3D seismic survey.

FIG. 1 shows a simplified portion of a 3D seismic source-receiver layout for a 3D seismic survey. Shown in FIG. 1 is a portion of a receiver array 12, positioned on the earth's surface, comprising three columns of receivers, with each column including eight receivers. Source array 14 includes a group of source locations. Typically, a seismic source is moved along the surface of the earth, and the source is activated at specific source locations in a sequence. The acoustic energy imparted at each source location travels through the earth and, after reflection from subsurface geologic interfaces, is detected by each receiver in the receiver array.

Also shown in FIG. 1 is an example of a common midpoint MP. The common midpoint shown is common to several source receiver paths in this survey. FIG. 1 illustrates MP as being a midpoint between source location S11 and receiver location R38; source location S21 and receiver location R28; source location S38 and receiver location R11; and source location S36 and receiver location R13. It will be apparent to those of ordinary skill in the art that location MP could be the common midpoint for a large number of source-receiver pairs, and also that there are a large number of common midpoints between other source receiver pairs. Each of these source-receiver paths may be of a different length (offset) and different direction (azimuth). Although common mid point gathers are typically used in implementing the present invention, if the subsurface strata are dipping rather than flat, additional processing known to those of ordinary skill in the art may be performed on the seismic data to develop common reflection point gathers to which the present invention may be applied.

As is well known in the art, normal moveout corrections are typically made to traces in a common midpoint gather to correct for the additional delay time for longer offset traces, so that the travel time of each seismic signal is effectively normalized to a zero-offset travel time. In situations where the earth exhibits no azimuthal anisotropy, the azimuthal variation will not introduce a variation in the data set. However, when azimuthal anisotropy is present in seismic survey signals, the standard normal moveout correction may not adequately correct for variations in delay times for traces from source-receiver pairs of different directions.

Variations in the seismic data traces will appear to be variations in amplitude as a function of the azimuthal variation, when in reality the variations in the seismic data traces are a result of azimuthally dependent time shifts. A velocity variation with azimuth of only a few percent can cause ten milliseconds or more of time difference in the location of an event in a seismic data trace. Accordingly, velocity variations below the resolution of conventional semblance based velocity analysis can distort the amplitude variation with incidence angle (AVO) and the amplitude variation with azimuth ("AVOA"), resulting in an incorrect computation.

In addition to the standard normal moveout correction, typically, for 3-D land acquisition, deconvolution, refraction statics, and two passes of surface consistent residual statics processes are applied to the data. As a preliminary to the performance of the invention as disclosed herein, noise reduction, trace scaling and any other single-trace process may be applied, however, the application of multi-trace processing should be avoided.

Flatten Events Within a Moving Time Window

Figure 2A:
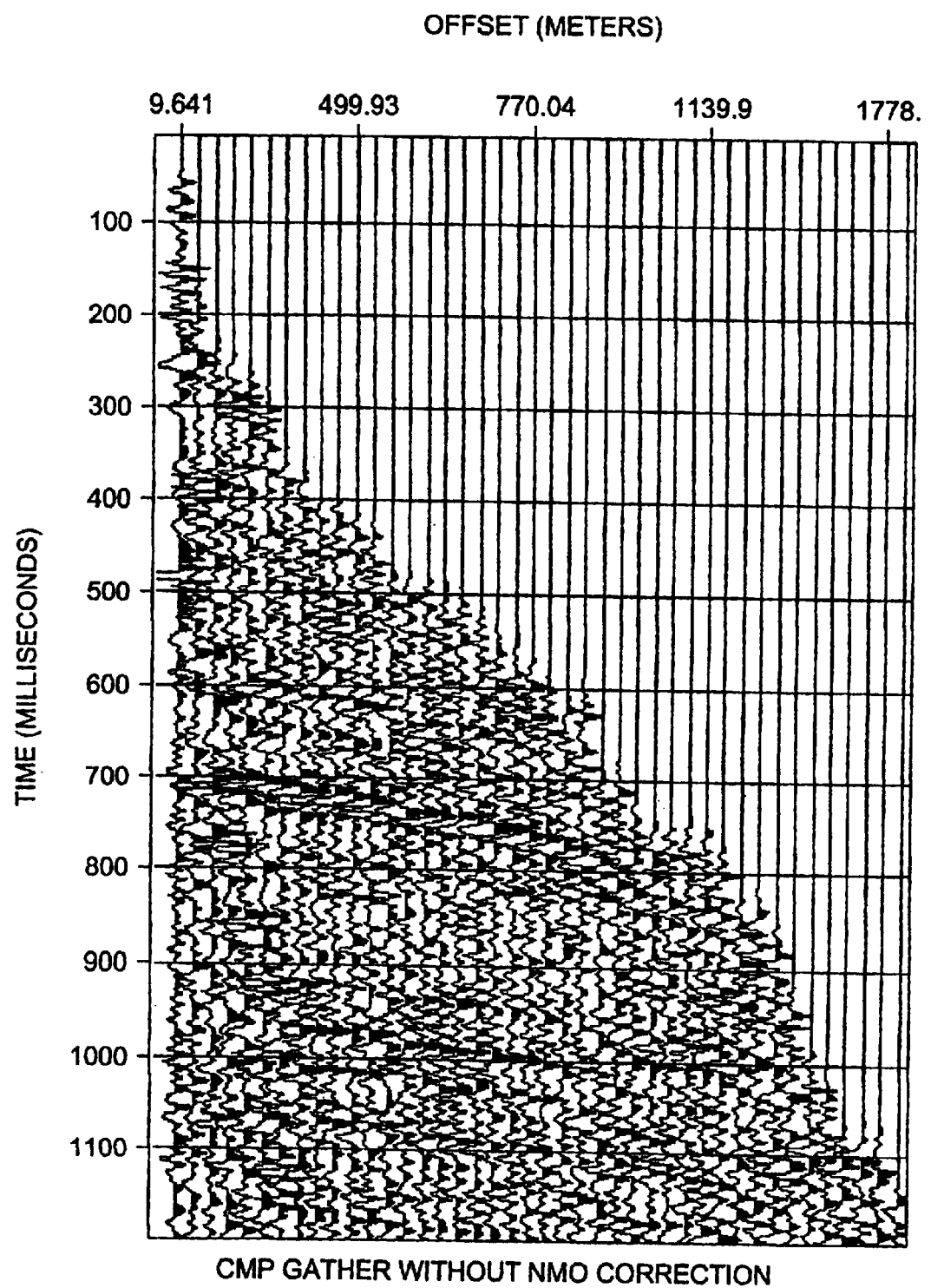
FIG. 2A shows representative seismic data traces from a common midpoint gather prior to application of normal moveout adjustment.
Figure 2B:
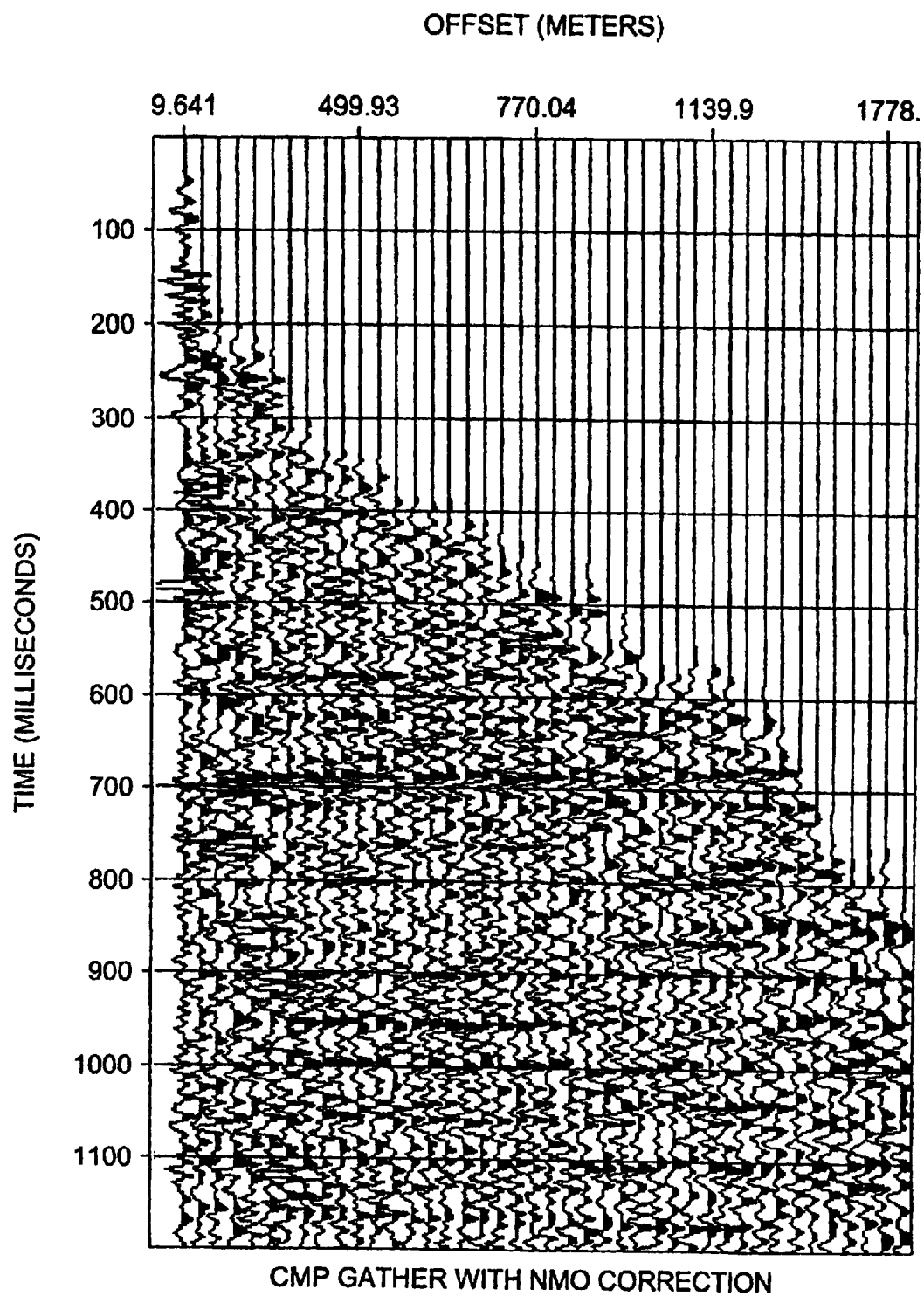
FIG. 2B shows the seismic data traces shown in FIG. after application of normal moveout adjustment.

If the velocity of the seismic signals in the subsurface vary with the azimuthal direction in which the seismic signals travel, the conventional normal moveout correction will not align the traces properly, and in accordance with a preferred embodiment of the invention, the following process may be utilized to achieve proper trace alignment. FIG. 2A and FIG. 2B show representative traces from a common midpoint gather. An initial velocity profile for the seismic traces may be generated in a conventional manner and normal moveout applied to the traces. FIG. 2A shows the traces prior to applying normal moveout adjustment to the traces and FIG. 2B shows these same traces after application of the normal moveout adjustment. As outlined in FIG. 3, and with reference to FIG. 2B, in a preferred embodiment of the invention a first time window is selected in step 50. Time windows utilized for performing the invention may typically be in the range of 100 to 300 milliseconds, however, the time window utilized may vary in accordance with the judgment of the processor. A first selected time window for the data shown in FIG. 2B may extend from 500 milliseconds to 700 milliseconds. In step 52, a spatial window comprising a number of spatially related traces is selected and the traces in this spatial window are summed together within the selected time window to create a "pilot" trace. In step 54, one trace is selected from the pilot trace, which will be referred to as the "input" trace. In step 56 the summed pilot trace is cross-correlated with the input trace within the selected time window and in step 58 the time shift between the input trace and pilot trace which yields the maximum correlation is determined and recorded.

The spatial window is then moved across the CMP gather within the selected time window by one trace and a new pilot trace is generated for this new spatial window. The new pilot trace is then correlated with the new input trace within the time window. This process is continued for the selected time window, with each successive data trace within the gather being designated as the "input trace" and cross-correlated with a pilot trace which comprises a plurality of nearby traces, to complete a time window trace correlation sequence. In this way the pilot trace represents the local phase and amplitude characteristics of the data for each "input" trace. Accordingly, a decision is made in step 60 as to whether a time window trace correlation sequence has been completed. If the answer is no, steps 52, 54, 56, 58 and 60 are repeated for a successive input trace. If the answer is yes, then in step 62 a decision is made as to whether the cross-correlation sequence just completed is the first performed cross-correlation process for the time window. In one implementation of the invention, if the answer is yes, the calculated time shift that provided maximum cross-correlation between the input trace and the pilot trace for each trace is applied to each trace in step 64 and steps 52, 54, 56, 58, 60 and 62 are repeated. If the answer in step 62 is no, then in step 66 a decision is made as to whether any reflection event in the time window is substantially aligned across the traces in the gather. If the answer is no steps 64, 52, 54, 56, 58, 60, 62 and 66 are repeated. This decision in step 66 is normally based on whether or not the additional time shifts calculated for the input traces in the just completed time window trace correlation sequence are significant. If the answer in step 66 is yes, then in step 68, the total computed time shifts for each trace are stored and the traces are returned to their form they were in prior to beginning the process outlined in FIG. 3. Typically, only two iterations of the process described in steps 52, 54, 56, 58, 60, 62 and 64 are performed, but further iterations may be performed if, in the judgment of the processor, data quality may be improved by further iterations.

A decision is made in step 70 as to whether all time windows of interest in the seismic data gather have been selected, and if the answer in no a new time window is selected in step 50 and the cross-correlation procedure described above with respect to steps 52, 54, 56, 58, 60, 62 64, 66, 68 and 70 is repeated for all time windows of interest. The successive time windows selected may occupy successive time positions on the seismic data traces or the time windows may overlap, depending on the quality of the data.

Following completion of the cross-correlation procedure for all time windows and all traces within each time window, in step 72, the amount of time shift which achieved the maximum correlation for each trace within each time window is applied to each trace at the center point within each time window, and, in step 74, time shifts for the remainder of the data traces are interpolated between these center points.

Each pilot trace may comprise, for example, eleven traces. The trace in the center of the selected spatial window, i.e. the sixth trace, may be designated as the "input" trace and cross-correlated with the pilot trace to obtain a time shift. The spatial trace window is then moved one trace across the gather and a new pilot trace formed. Again, the trace in the center of this window, i.e. the next trace in the gather, is designated as the "input" trace and cross-correlated with the pilot trace to obtain a time shift for that trace. At the edges of the gather, in this example the first through the sixth traces, the spatial window comprising the pilot trace may be shortened so that, if the first trace is the "input" trace, the first through sixth traces are stacked to form the pilot trace, and for the second trace, the first through the seventh traces are stacked and so on, until the full number of traces desired in the spatial window is reached (in this example, eleven). The number of traces selected to form the pilot trace may be selected on the basis of the magnitude of amplitude variation with offset in the data and the magnitude of noise such as multiple contamination.

In performing the cross-correlation procedure, amplitude and phase variations with offset, including the case where an event reverses polarity at some offset are taken into account. The pilot trace represents the "local" data characteristics. If an event reverses polarity at far offsets then the pilot trace at near offsets should not include the far offset traces. Similarly, the pilot trace at far offsets will not include traces at near offsets.

Other trace attributes, including absolute values, RMS values, or trace envelope may be used for performing the cross-correlation in addition to the raw trace reflection amplitude.

Figure 4:
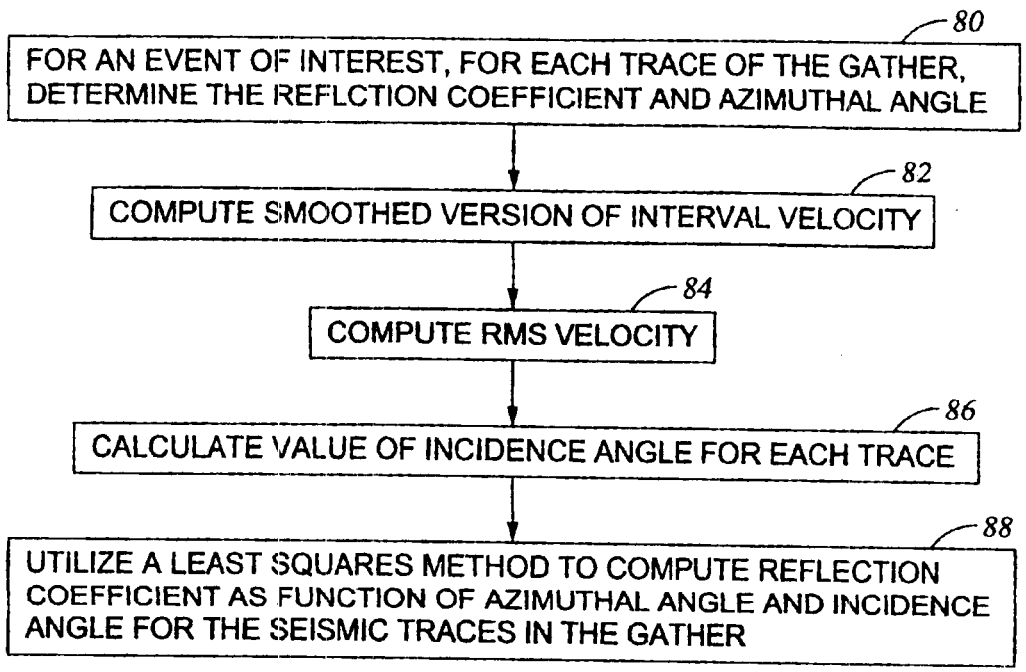
FIG. 4 is a flow chart showing a further embodiment of the invention.

At such time as the time shifts have been applied to the seismic data traces in the gather, AVO analysis as well as AVOA analysis, such as discussed herein with reference to FIG. 4, may be performed on the adjusted traces.

Computing the Amplitude Variation with Incidence Angle (AVO), and the Amplitude Variation with Azimuth (AVOA)

Figure 8:
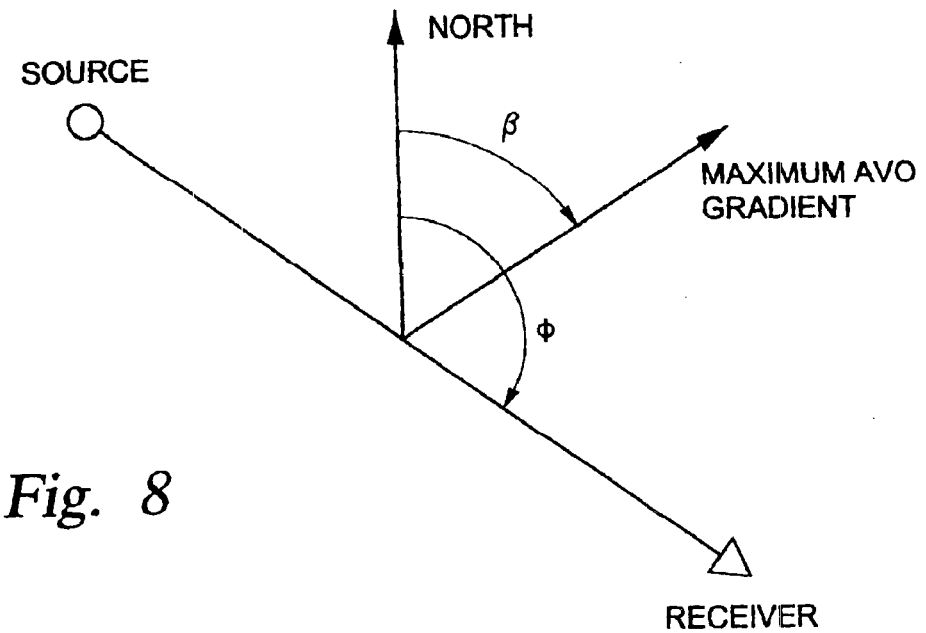
FIG. 8 is a diagram illustrating a spatial relationship of the invention.

It is known to those of ordinary skill in the art that amplitude variation with incidence angle (also referred to as amplitude variation with offset), as well as the amplitude variation with azimuth for a reflection from a horizontal transverse isotropic layer of the earth which is overlain with an isotropic overburden can be approximated by the following equation:

$$R(\theta,\phi)=I+G_1 \sin^2(\theta)+G_2 \sin^2(\theta)\cos^2(\phi-\beta) \quad \text{(Eq. 1)}$$

where: $R(\theta,\phi)$ is the reflection coefficient as a function of $\theta$, the incidence angle of the seismic energy at a subsurface reflecting interface relative to the vertical, and $\phi$, the receiver azimuth with respect to a predefined zero azimuth direction (for example, true north);

I is the P-wave impedance contrast between the subsurface layers from which the signal is reflected;

$G_1$ is the isotropic AVO gradient;

$G_2$ is the azimuthal or anisotropic term; and $\beta$ (with reference to FIG. 8) is the angle between the predefined zero azimuth direction (such as true north) and the maximum AVO gradient direction.

$G_1$ and $G_2$ are given by:

$$G_1 = \frac{1}{2}\frac{\Delta V_P}{\overline{V}_p} - 2\left(\frac{1}{g}\right)^2\left(2\frac{\Delta V_s}{\overline{V}_s} + \frac{\Delta \rho}{\overline{\rho}}\right), \text{ and} \quad \text{(Eq. 2)}$$

$$G_2 = \Delta\delta^{(v)} + 2\left(\frac{1}{g}\right)^2 \Delta\gamma, \quad \text{(Eq. 3)}$$

where: $\Delta\rho$, $\Delta V_p$ and $\Delta V_s$ are the change in density, the change in P-wave velocity, and the change in S-wave velocity, respectively, $\overline{\rho}$, $\overline{V}_p$ and $\overline{V}_s$ are the average density, the average P-wave velocity and the average S-wave velocity respectively, $$g = \frac{\overline{V}_p}{\overline{V}_s},$$

the average P-wave velocity divided by the average S-wave velocity, $\Delta\delta^{(v)}$ is the change in $\delta^{(v)}$ across the reflecting boundary, and $\Delta\gamma$ is the change in the shear wave splitting parameter $\gamma$ across the reflecting boundary, where:

$$\gamma = \frac{C_{1212} - C_{3232}}{2C_{3232}}.$$

It is known to those of ordinary skill in the art that for a linearly elastic material, each component of stress $\sigma_{ij}$ is linearly dependent on every component of strain $\epsilon_{kl}$, where i, j, k and l are directional indices that may assume values of 1, 2 or 3. The stress-strain dependency is given by Hooke's Law:

$$\sigma_{ij} = C_{ijkl}\epsilon_{kl}$$

where $C_{ijkl}$ is the elastic modulus tensor and completely characterizes the elasticity of the medium. The relationship between $\delta^{(v)}$ and the elastic modulus tensor is given by:

$$\delta^{(v)} = \frac{(C_{1133} - C_{3232})^2 - (_{3333} - C_{3232})^2}{2C_{3333}(C_{3333} - C_{3232})^2}$$

However, without knowing $\beta$, Eq. 1, cannot be solved using a least squares approach. However, Eq. 1 can be rewritten as:

$$R(\theta,\phi) = I + \{G_1 + G_2 \cos^2(\theta-\beta)\} \sin^2(\theta) \quad \text{(Eq. 4)}$$

which can be rewritten as:

$$R(\theta,\phi) = I + \{G_1^* + (G_2^* - G_1^*)\cos^2(\phi-\beta)\} \sin^2(\theta) \quad \text{(Eq. 5)}$$

so that $G_1 = G_1^*$ and $G_2 = G_2^* - G_1^*$.
Utilizing the equality:

$$G_1^* + (G_2^* - G_1^*)\cos^2(\phi-\beta) = G_2^* \cos^2(\phi-\beta) + G_1^* \sin^2(\phi-\beta) \quad \text{(Eq. 6)}$$

then $$R(\theta,\phi) = I + [G_2^* \cos^2(\phi-\beta) + G_1^* \sin^2(\phi-\beta)] \sin^2(\theta). \quad \text{(Eq. 7)}$$

It is known to those of ordinary skill in the art that:

$$G_1^* \cos^2(\phi-\beta) + G_1^* \sin^2(\phi-\beta) = W_{11} \cos^2(\phi) + 2W_{12} \cos(\phi)\sin(\phi) + W_{22} \sin^2(\phi) \quad \text{(Eq. 8)}$$

which is linear in the unknowns $W_{11}$, $W_{12}$ and $W_{13}$, which can be related back to the unknowns $G_1^*$, $G_2^*$ and $\beta$, as follows:

$$G_2^* = 0.5(W_{11} + W_{22} + \sqrt{(W_{11} - W_{22})^2 + 4W_{12}^2}) \quad \text{(Eq. 9)}$$

$$G_1^* = 0.5(W_{11} + W_{22} - \sqrt{(W_{11} - W_{22})^2 + 4W_{12}^2}) \quad \text{(Eq. 10)}$$

$$\beta = ATAN\left\{\frac{(W_{11} - W_{22} + \sqrt{(W_{11} - W_{22})^2 + 4W_{12}^2})}{2W_{12}}\right\} \quad \text{(Eq. 11)}$$

Thus, combining Equations 1 with Equations 4–11, Equation 1 can be written as:

$$R(\theta,\phi) = I + [W_{11} \cos^2(\phi) + 2W_{12} \cos(\phi)\sin(\phi) + W_{22} \sin^2(\phi)] \sin^2(\theta) \quad \text{(Eq. 12)}$$

with $$G_1 = 0.5(W_{11} + W_{22} - \sqrt{(W_{11} - W_{22})^2 + 4W_{12}^2}) \quad \text{(Eq. 13)}$$

$$G_2 = \sqrt{(W_{11} - W_{22})^2 + 4W_{12}^2} \quad \text{(Eq. 14)}$$

and $$\beta = ATAN\left\{\frac{(W_{11} - W_{22} + \sqrt{(W_{11} - W_{22})^2 + 4W_{12}^2})}{2w_{12}}\right\} \quad \text{(Eq. 15)}$$

Values of the reflection coefficient $R(\theta,\phi)$ for specific values of the incidence angle $\theta$ and the source-receiver azimuth $\phi$ can be obtained from the recorded seismic data for each reflection event by extracting the amplitudes of the seismic data traces as a function of offset and azimuth. With reference to FIG. 4, in step 80, values of the reflection coefficient $R(\theta,\phi)$ and the source-receiver azimuth $\phi$ are obtained from the seismic data that is being processed. To obtain the value of an incidence angle $\theta$, a smoothed version of the interval velocity is calculated in step 82 in a manner well known to those of ordinary skill in the art, and the RMS velocity is computed in step 84 from the smoothed version of the interval velocity. In step 86, the values of the incidence angle, $\theta$, may then be determined, utilizing the following equation:

$$\theta = ASIN\left\{\frac{V_{int}}{V_{rms}} \frac{X}{\sqrt{X^2 + T_0^2 V_{rms}^2}}\right\} \quad \text{(Eq. 16)}$$

where:
X is the source to receiver offset;
$T_0$ is the zero offset two way travel time;
$V_{rms}$ is the RMS velocity; and
$V_{int}$ is the interval velocity at the time of interest.

In step 88, a least squares method is used to compute reflection coefficient as a function of azimuthal angle and incidence angle for the seismic traces comprising the CMP gather. Eq. 12 is solved in a straightforward least squares manner, known to those of ordinary skill in the art, for the unknowns, I, $W_{11}$, $W_{22}$, and $W_{12}$. Values for $G_1$ (the isotropic AVO gradient), $G_2$ (the azimuthal or anisotropic term) and $\beta$ may then be computed from values computed for $W_{11}$, $W_{22}$, and $W_{12}$. Accordingly, it is demonstrated that Eq. 1 is linear in I, $G_1$, $G_2$ and the direction $\beta$.

Note that as indicated above in Eqs. 2 and 3, the derived gradients $G_1$ and $G_2$ are related to physical rock properties $$\frac{\Delta V_P}{\overline{V}_P}, \frac{\Delta V_S}{\overline{V}_S}, \frac{\overline{V}_P}{\overline{V}_S}, \frac{\Delta\rho}{\rho},$$

$\Delta\delta^{(v)}$ and $\Delta\gamma$.

Computing The Azimuthal Velocity Variation (AVV)

Figure 3:
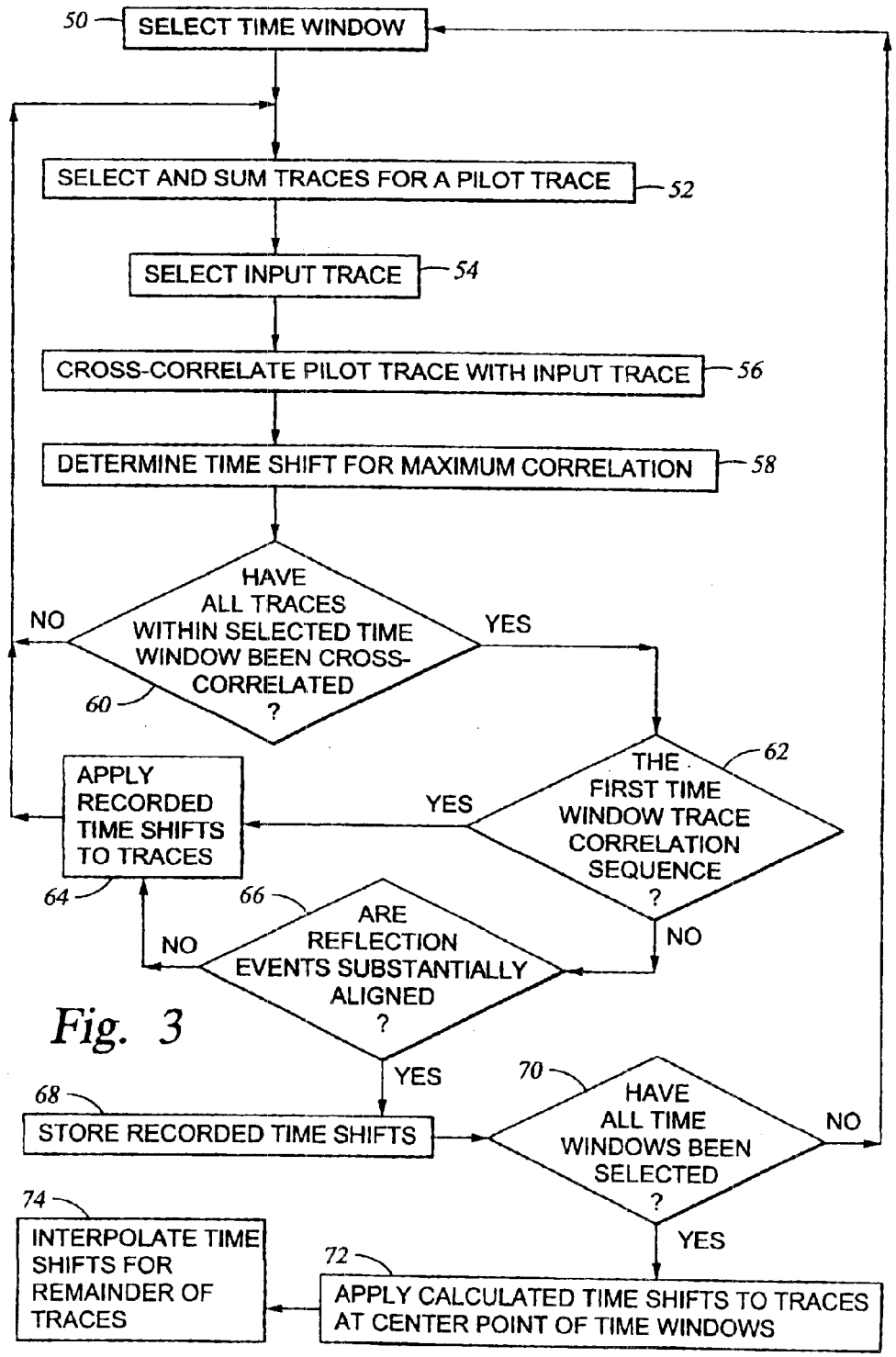
FIG. 3 is a flow chart showing an embodiment of the invention.
Figure 5:
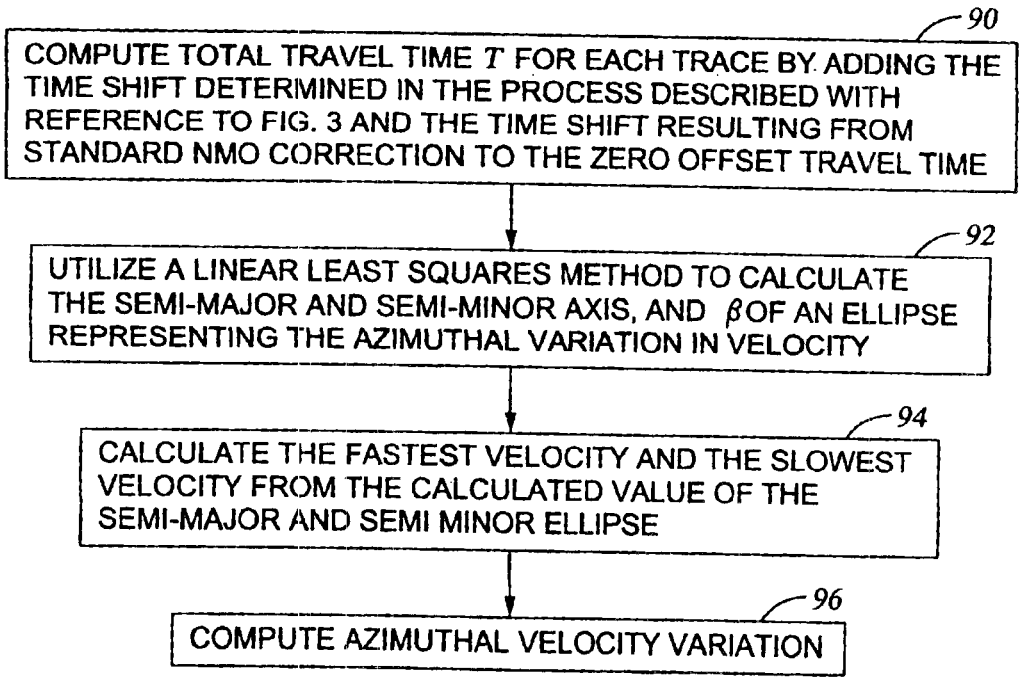
FIG. 5 is a flow chart showing a further embodiment of the invention.
Figure 6:
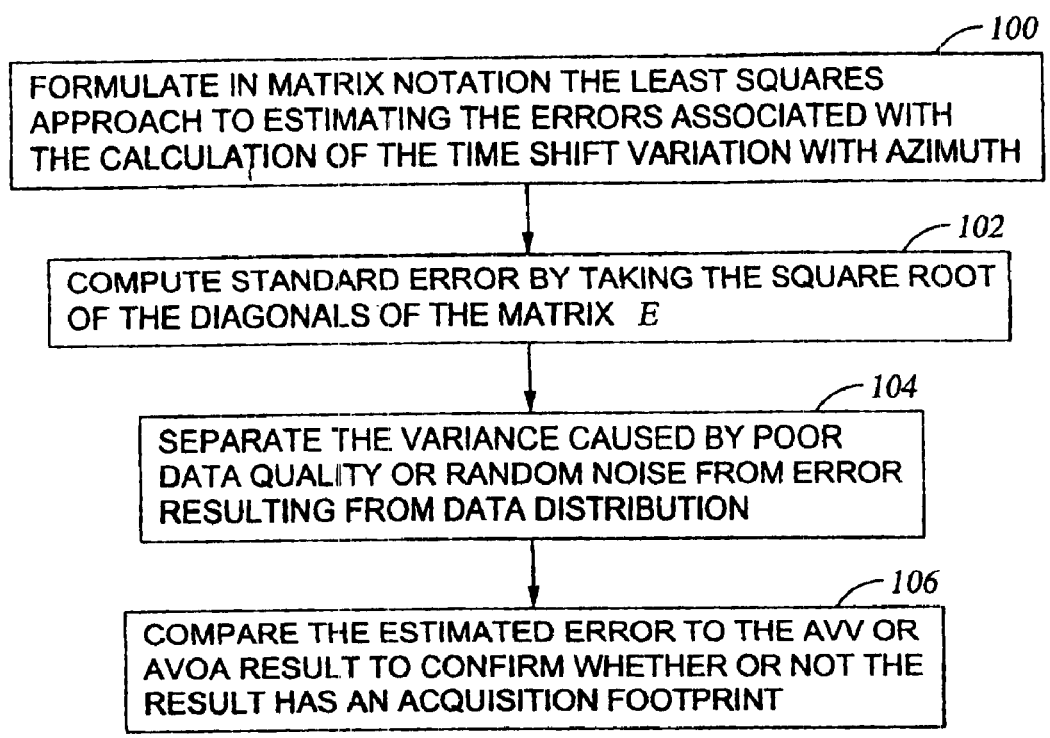
FIG. 6 is a flow chart showing a further embodiment of the invention.

Because the process outlined in FIG. 3 determines the time shift in seismic traces associated with the azimuthal velocity variation, this determined time shift information may be used to compute the actual azimuthal velocity variation. Steps for computing the azimuthal variation of velocity are outlined in FIG. 5. In step 90 the total travel time T for each trace is computed by adding the time shifts determined in the process described with reference to FIG. 3 which achieved maximum correlation for each trace and the time shift obtained as a result of standard NMO correction to $T_0$, the zero offset travel time. The following equation may then be utilized to solve for the azimuthal velocity variation:

$$T^2 = T_0^2 + \frac{X^2}{V_{nmo}^2(\phi)} \qquad \text{(Eq. 17)}$$

where:
T=total travel time
$T_0$=two way zero-offset traveltime
X=offset
$V_{nmo}(\phi)$=the azimuthally varying velocity as a function of the azimuth $\phi$,
and $$\frac{1}{V_{nmo}^2(\phi)} = W_{11}\text{Cos}^2(\phi) + 2W_{12}\text{Cos}(\phi)\text{Sin}(\phi) + W_{22}\text{Sin}^2(\phi) \qquad \text{(Eq. 18)}$$

Accordingly, the total traveltime may be written as:

$$T^2 = T_0^2 + [W_{11}\text{Cos}^2(\phi) + 2W_{12}\text{Cos}(\phi)\text{Sin}(\phi) + W_{22}\text{Sin}^2(\phi)]X^2. \text{(Eq. 19)}$$

In step 92, Eq. 19 may be solved by using a linear least squares method known to those of ordinary skill in the art, using the time shifts picked from the cross-correlation process described with reference to FIG. 3 which achieved maximum correlation. Eqs. 9, 10 and 11 may then be used to obtain $G_1^*$, $G_2^*$ and $\beta$. The fastest velocity and the slowest velocity are calculated from the calculated values of $G_1^*$ and $G_2^*$. The fastest velocity is given by $$V_{fast} = \frac{1}{\sqrt{G_1^*}},$$

the slowest velocity is given by $$V_{slow} = \frac{1}{\sqrt{G_2^*}},$$

and the azimuth of the slowest velocity is given by $\beta$.

Because the travel times are being fitted by the least squares solving of Eq. 19, the azimuth $\beta$ that is computed using Eq. 19 is the azimuth of the greater travel time. Accordingly, if the travel time is greater, the velocity is slower. The azimuthal velocity variation may then be computed in step 94 from the following relationship:

$$\frac{1}{V_{nmo}^2(\phi)} = \frac{1}{V_{slow}^2}\text{Cos}^2(\phi - \beta) + \frac{1}{V_{fast}^2}\text{Sin}^2(\phi - \beta). \qquad \text{(Eq. 20)}$$

The amount of time shift resulting from azimuthal anisotropy may be determined for each reflection event as a function of azimuthal angle and the appropriate time shift may be applied to each trace to adjust for the azimuthal time shift. At such time as the time shifts have been applied to the seismic data traces in the gather, AVO analysis as well as AVOA analysis, such as discussed herein with reference to FIG. 4, may be performed on the adjusted traces.

Computing of Errors Associated with Calculation of Time Shift Variation, Velocity Variation and Amplitude Variation with Azimuth Errors associated with the calculation of the time shift variation with azimuth, the velocity variation with azimuth, and the amplitude variation with azimuth may be estimated utilizing a least squares approach. In step 100, the least squares approach to estimating the errors associated with the calculation of the time shift variation with azimuth is formulated in matrix notation, and may be written:

$$A\vec{x} = \vec{b} \qquad \text{(Eq. 21)}$$

Where $\vec{b}$ is a 1×N matrix (i.e. a vector) containing the data (e.g. travel times or amplitudes), A is an M×N matrix of coefficients (e.g. $\text{Sin}^2(\theta)$) and $\vec{x}$ is a 1×M matrix (i.e. a vector) of the parameters to be solved for. For instance for Eq. 19:

$$A = \begin{pmatrix} 1 & X_1^2\cos^2\phi_1 & X_1^2\cos\phi_1\sin\phi_1 & X_1^2\sin^2\phi_1 \\ 1 & X_2^2\cos^2\phi_2 & X_2^2\cos\phi_2\sin\phi_2 & X_2^2\sin^2\phi_2 \\ 1 & X_3^2\cos^2\phi_3 & X_3^2\cos\phi_3\sin\phi_3 & X_3^2\sin^2\phi_3 \\ \vdots & \vdots & \vdots & \vdots \\ 1 & X_n^2\cos^2\phi_n & 2X_n^2\cos\phi_n\sin\phi_n & X_n^2\sin^2\phi_n \end{pmatrix}$$

$$\vec{x} = \begin{pmatrix} T_0^2 \\ w_{11} \\ w_{12} \\ w_{13} \end{pmatrix}$$

and $$\vec{b} = \begin{pmatrix} T_1^2 \\ T_2^2 \\ T_3^2 \\ \vdots \\ T_n^2 \end{pmatrix}$$

Where $T_n$ are the observed travel times for data with source-receiver offsets $X_n$ and azimuth $\phi_n$. The matrix equation is equivalent to N simultaneous equations for M unknowns. In the example shown, M is equal to four. For a least squares formulation, N, the number of data points, must be greater than M, the number of unknowns. There are various standard numerical methods, known to those of ordinary skill in the art, for computing the M unknowns.

In step 102, the standard error in the unknowns is computed by taking the square root of the diagonals of the matrix E:

$$E = (A^T A)^{-1}\sigma^2, \qquad \text{(Eq. 22)}$$

where the superscript T refers to the matrix transpose, $\sigma^2$ is the variance (i.e. sum of squares of the differences between the data and the computed fit divided by n−4). The diagonals of the matrix E represent the errors in each unknown so that the square root of the $m^{th}$ diagonal element (i.e. $\sqrt{E_{mm}}$) is the standard error in the $m^{th}$ unknown.

The least squares method allows for the computation of errors contained in the matrix A, which include both the variance (error) caused by poor data quality or random noise as well as the expected error resulting from the data distribution. Note that the elements of the matrix A are functions of the offsets and azimuths in the data, which are then combined and used to compute the errors. In addition, since the variance caused by poor data quality or random noise can be computed independently, the variance caused by poor data quality or random noise, $$E = (A^T A)^{-1}, \quad \text{(Eq. 23)}$$

and the error resulting from the data distribution, $$E = \sigma, \quad \text{(Eq. 24)}$$

can be separated in step 104 and either one or both compared in step 106 to the AVV or AVOA result to confirm whether or not the result has an acquisition 'footprint'—a pattern that is caused by the acquisition geometry. Typically, this comparison is done visually, although those of ordinary skill in the art would know to make the comparison mathematically. An indicia of the accuracy of the obtained results is the absence of the acquisition geometry (such as fold, maximum offset and minimum offset) being present in the obtained results.

Errors associated with the calculation of the amplitude variation with azimuth may be calculated in an analogous manner to the calculation of the errors associated with the calculation of the time shift variation with azimuth, with the process being applied to Eq. 12 rather than Eq. 19. Because the velocity variation is calculated from the travel time variation, the errors calculated for the time shift variations with azimuth are applicable to the velocity variations with azimuth.

Computing a New Surface Consistent Statics Solution.

An azimuthal velocity variation (AVV) will cause offset dependent and time dependant statics in CMP sorted gathers. Surface consistent statics solutions for a CMP gather typically use a pilot trace comprising a stack which includes all offsets and azimuths in the gather. If AVV exists, the far offsets will not align with the near offsets and will not stack coherently, thus the pilot trace will be representative of the near offset traces, which are relatively unaffected by the AVV. To obtain a single static per trace, a cross-correlation between each trace and the pilot trace is performed over a large time window (for example, two seconds), typically around a target horizon. If the time delay due to AVV changes with time, then the pilot trace will not be representative of the far offset traces, since the far offset traces will be stretched and squeezed relative to the near offsets and thus also relative to the pilot trace. For instance, a particular azimuth may be in the slow direction (resulting in a shift to later times) at one traveltime, but change to the fast direction (resulting in a shift to earlier times) at a later traveltime. Thus when this trace is correlated with the pilot trace, a poor cross-correlation may be obtained, possibly resulting in an incorrectly picked static for that trace. Even if a static is picked that represents the 'average' time delay due to AVV, it will appear as noise in the surface consistent statics computation (the "SCSC") because this computation assumes the statics are surface consistent, when in fact the time delays due to AVV are not.

Figure 7:
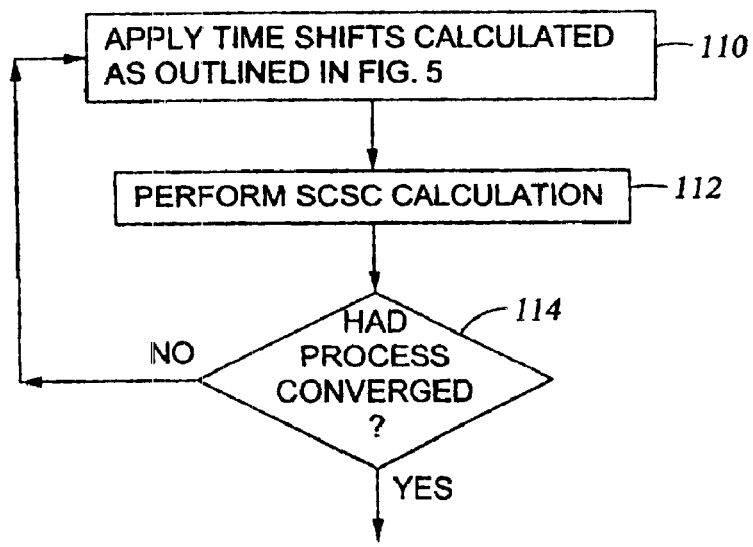
FIG. 7 is a flow chart showing a further embodiment of the invention.

In accordance with an embodiment of the present invention, as outlined in FIG. 7, an iterative process is utilized in which, in step 110, time shifts are computed as described above with reference to FIG. 5, which are then applied to the seismic data traces in a manner equivalent to a normal moveout correction, followed by step 112, in which surface consistent statics calculations known to the prior art are performed. The time shift step of 110 is then repeated. This process of computing and applying the time shifts resulting from azimuthal velocity variations and computing the surface consistent statics is repeated until the process converges. This determination of whether the process has converged is made in step 114. One criterion that may be applied to determine whether the process is converged is whether the time shifts computed from the surface consistent statics computation are generally less than two milliseconds.

At such time as the time shifts resulting from azimuthal anisotropy have been applied to the seismic data traces in the gather, AVO analysis as well as AVOA analysis, such as discussed herein with reference to FIG. 4, may be performed on the adjusted traces.

Figure 9:
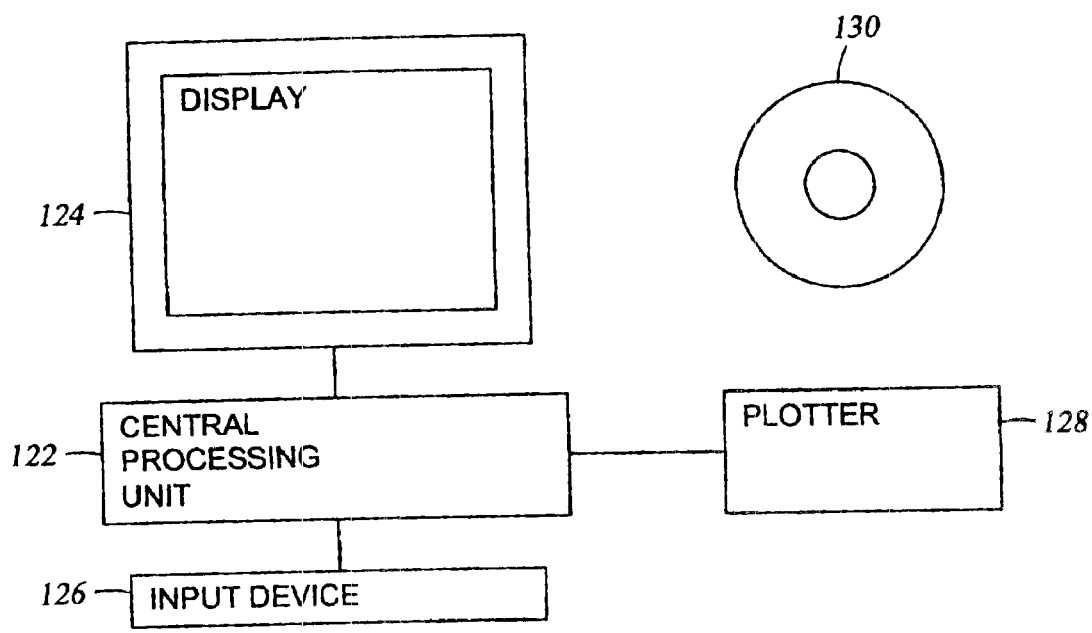
FIG. 9 shows a computer system for carrying out the invention.

The process of the invention disclosed herein is most conveniently carried out by writing a computer program to carry out the steps described herein on a work station or other conventional digital computer system of a type normally used in the industry. The generation of such a program may be performed by those of ordinary skill in the art based on the processes descried herein. FIG. 9 shows such a conventional computer system comprising a central processing unit 122, a display 124, an input device 126, and a plotter 128. The computer program for carrying out the invention will normally reside on a storage media (not shown) associated with the central processing unit. Such computer program may be transported on a CD-ROM or other storage media shown symbolically as storage medium 130

The results of the calculations according this invention may be displayed with commercially available visualization software. Such software is well known to those of ordinary skill in he art and will not be further described herein. It should be appreciated that the results of the methods of the invention can be displayed, plotted or both While the invention has been described and illustrated herein by reference to certain preferred embodiments in relation to the drawings attached hereto, various changes and further modifications, apart from those shown or suggested herein, may be made herein by those skilled in the art, without departing from the spirit of the invention, the scope of which is defined by the following claims.

We claim:

1. A method for processing seismic data to estimate a time shift resulting from velocity anisotropy in the earth's subsurface, comprising: forming a gather of seismic data traces; and cross-correlating seismic data traces included in said gather within a time window to estimate a time shift in the seismic data traces resulting from velocity anisotropy in the earth's subsurface.

2. The method of claim 1 further comprising adjusting seismic data traces included in said gather by the amount of the estimated time shift.

3. The method of claim 2 further comprising performing an amplitude variation with incidence angle analysis on said adjusted seismic data traces.

4. The method of claim 2 further comprising performing an amplitude variation with azimuth analysis on said adjusted seismic data traces.

5. The method of claim 2 further comprising: determining the incidence angle for seismic data traces included in said gather; and calculating the amplitude variation with azimuth and amplitude variation with offset by applying a least squares analysis process to reflection coefficient, source-receiver azimuth angle and incidence angle data for seismic data traces included in said gather.

6. The method of claim 1 further comprising applying a least squares analysis process to the time shift of said seismic data traces to calculate the velocity variation with azimuth in seismic data traces included in said gather.

7. A method for processing seismic data comprising: forming a gather of seismic data traces; performing a surface consistent statics computation on seismic data traces included in said gather; cross-correlating successively selected seismic data traces in said gather to estimate the time shift in seismic data traces included in said gather resulting from azimuthal velocity anisotropy in the earth's subsurface, applying a least squares analysis process to the time shifts of said seismic data traces to calculate the velocity variation with azimuth in seismic data traces included in said gather; utilizing the calculated velocity variations with azimuth to calculate time shifts seismic data traces included in said gather; applying said calculated time shifts to said seismic data traces included in said gather; and applying a least squares analysis process to reflection coefficient, source-receiver azimuth angle and incidence angle data for seismic data traces included in said gather to calculate the amplitude variation with azimuth and amplitude variation with offset inseismic data traces included in said gather.

8. A method for processing seismic data to estimate a time shift resulting from velocity anisotropy in the earth's subsurface, comprising: forming a gather of seismic data traces; forming a pilot trace by combining a selected plurality of said seismic data traces within a selected time window; cross-correlating a selected seismic data trace included in said gather with said pilot trace to estimate the time shift in said selected seismic data trace resulting from velocity anisotropy in the earth's subsurface.

9. A method for processing seismic data to estimate time shift resulting from velocity anisotropy in the earth's subsurface, comprising: (a) forming a gather of seismic data traces; (b) forming a pilot trace by combining a selected plurality of said seismic data traces within a selected time window; (c) cross-correlating a selected seismic data trace included in said gather with said pilot trace to estimate the time shift in said selected seismic data trace resulting from velocity anisotropy in the earth's subsurface; and repeating steps (b) and (c) until all seismic data traces within said gather have been cross-correlated with a pilot trace.

10. A method for processing seismic data, comprising: (a) forming a gather of seismic data traces; (b) forming a pilot trace by combining a selected plurality of said seismic data traces within a selected time window; (c) cross-correlating a selected seismic data trace included in said gather with said pilot trace to estimate the time shift in said selected seismic data trace resulting from velocity anisotropy in the earth's subsurface; repeating steps (b) and (c) until all seismic data traces within said gather have been cross-correlated with a pilot trace; and adjusting each said selected seismic data trace by the amount of the estimated time shift in each said selected seismic data trace resulting from velocity anisotropy.

11. The method of claim 10 further comprising performing an amplitude variation with incidence angle analysis on said adjusted seismic data traces.

12. The method of claim 10 further comprising performing an amplitude variation with azimuth analysis on said adjusted seismic data traces.

13. A method for processing seismic data, comprising: (a) forming a gather of seismic data traces; (b) forming a pilot trace by combining a selected plurality of said seismic data traces within a selected time window; (c) cross-correlating a selected seismic data trace included in said gather with said pilot trace to estimate the time shift in said selected seismic data trace resulting from velocity anisotropy in the earth's subsurface; repeating steps (b) and (c) until all traces within said gather have been correlated with a pilot trace; adjusting each said selected seismic data trace by the amount of the estimated time shift in each said selected seismic data trace resulting from velocity anisotropy; determining the incidence angle for each selected seismic data trace; and applying a least squares analysis process to reflection coefficient, source-receiver azimuth angle and incidence angle data of said seismic data traces to calculate the amplitude variation with azimuth and amplitude variation with offset in seismic data traces included in said gather.

14. A method for processing seismic data, comprising: (a) forming a gather of seismic data traces; (b) forming a pilot trace by combining a selected plurality of said seismic data traces within a selected time window; (c) cross-correlating a selected seismic data trace included in said gather with said pilot trace to estimate the time shift in said selected seismic data trace resulting from velocity anisotropy in the earth's subsurface; repeating steps (b) and (c) until all seismic data traces within said gather have been correlated with a pilot trace; and applying a least squares analysis process to the time shifts of said seismic data traces to calculate the velocity variation with azimuth in seismic data traces included in said gather.

15. The method of claim 13 further comprising utilizing a least squares analysis to estimate errors associated with the calculation of amplitude variation in said selected seismic data traces.

16. The method of claim 14 further comprising utilizing a least squares analysis to estimate errors associated with the calculation of time shift variation in said selected seismic data traces.

17. The method of claim 14 further comprising utilizing a least squares analysis to estimate errors associated with the calculation of velocity variation in said selected seismic data traces.

18. A method for processing seismic data comprising: (a) forming a gather of seismic data traces; (b) performing a surface consistent statics computation on said seismic data traces; (c) cross-correlating successively selected seismic data traces in said gather with a pilot trace formed by combining a selected plurality of seismic data traces in said gather within selected time windows to estimate the time shift in said seismic data traces resulting from azimuthal velocity anisotropy in the earth's subsurface, and applying a least squares analysis process to the time shifts of said seismic data traces to calculate the velocity variation with azimuth in seismic data traces included in said gather; (d) utilizing the calculated velocity variations with azimuth to calculate time shifts in seismic data traces included in said gather; (e) applying said calculated time shifts to said seismic data traces included in said gather; repeating steps (b)–(e); and applying a least squares analysis process to reflection coefficient, source-receiver azimuth angle and incidence angle data of said seismic data traces to calculate the amplitude variation with azimuth and amplitude variation with offset in seismic data traces included in said gather.

19. A digital computer programmed to utilize seismic data traces obtained over a region of the earth's subsurface to perform a process comprising the steps of: forming a gather of seismic data traces; forming a pilot trace by combining a selected plurality of said seismic data traces; and cross-correlating a selected seismic data trace included in said gather with said pilot trace to estimate the time shift in said selected seismic data trace resulting from velocity anisotropy in the earth's subsurface.

20. A device which is readable by a digital computer having instructions defining the following process and instructions to the computer to perform said process: forming a gather of seismic data traces; forming a pilot trace by combining a selected plurality of said seismic data traces within a selected time window; and cross-correlating a selected seismic data trace included in said gather with said pilot trace to estimate the time shift in said selected seismic data trace resulting from velocity anisotropy in the earth's subsurface.

21. The device of claim 20 wherein said device is selected from the group consisting of a magnetic tape a magnetic disk, an optical disk and a CD-ROM.

22. The method of claim 1 further comprising utilizing the estimated time shift of said seismic data traces to calculate at least one of: i) an amplitude variation with azimuth value in seismic data traces included in said gather and ii) a velocity variation with azimuth value in seismic data traces included in said gather.

23. The method of claim 22 wherein utilizing the estimated times shift further comprises a least squares analysis process.

24. The method of claim 1 further comprising utilizing the estimated time shift of said seismic data traces to calculate the amplitude variation with incidence angle in seismic data traces included in said gather.

25. The method of claim 24 wherein utilizing the estimated times shift further comprises a least squares analysis process.

26. The method of claim 1 further comprising utilizing the estimated time shift, reflection coefficient, source-receiver azimuth angle and incidence angle data for seismic data traces included in said gather to calculate an amplitude variation with azimuth value.

27. The method of claim 1 further comprising: determining the incidence angle for seismic data traces included in said gather; and applying a least squares analysis process to reflection coefficient, source-receiver azimuth angle and incidence angle data for seismic data traces included in said gather to calculate the amplitude variation with azimuth in seismic data traces included in said gather.

28. The method of claim 1 wherein estimating the time shift further comprises cross-correlating said seismic data traces with a pilot trace composited from a plurality of traces of said seismic data gather.

29. The method of claim 28 wherein forming said pilot trace further comprises compositing a plurality of traces within a predetermined spatial window within said gather of seismic traces.

30. The method of claim 1 further comprising using the estimated time shift in said seismic data traces for determining a time shift correction for seismic data traces included in said gather.

31. The method of claim 30 further comprising applying said time shift correction to said seismic data traces.

32. The method of claim 31 further comprising performing an amplitude variation with incidence angle analysis on said corrected seismic data traces.

33. The method of claim 31 further comprising performing at least one of: i) an amplitude variation with azimuth analysis on said corrected seismic data traces and ii) a velocity variation with azimuth analysis on said corrected seismic data traces.

34. The method of claim 31 further comprising determining a surface consistent statics correction for said seismic data traces.

35. A digital computer programmed to utilize seismic data traces obtained over a region at the earth's subsurface to perform a process comprising:
(a) forming a gather of seismic data traces; and
(b) cross-correlating seismic data traces included in said gather within a time window to estimate a time shift in the seismic data traces resulting from velocity anisotropy in the earth's subsurface.

36. The digital computer of claim 35 further programmed to perform a process comprising utilizing the estimated time shift of said seismic data traces to calculate at least one of: i) an amplitude variation with azimuth value in seismic data traces included in said gather and ii) a velocity variation with azimuth value in seismic data traces included in said gather.

37. The digital computer of claim 36 wherein utilizing the estimated time shift further comprises a least squares analysis process.

38. The digital computer of claim 35 further programmed to perform a process comprising applying a least squares analysis process to the time shift of said seismic data traces to calculate an amplitude variation with incidence angle value in seismic data traces included in said gather.

39. The digital computer of claim 35 further programmed to perform a process to calculate an amplitude variation with azimuth value utilizing the estimated time shift, reflection coefficient, source-receiver azimuth angle and incidence angle data for seismic data traces included in said gather.

40. The digital computer of claim 35 wherein the process for estimating the time shift further comprises cross-correlating said seismic data traces with a pilot trace composited from a plurality of traces of said seismic data gather.

41. The digital computer of claim 40 wherein the pilot trace further comprises a plurality of traces composited from within a predetermined spatial window within said gather of seismic traces.

42. The digital computer of claim 35 further programmed to perform a process comprising using the estimated time shift in said seismic data traces for determining a time shift correction for said seismic data traces included in said gather.

43. The digital computer of claim 42 further programmed to perform a process comprising applying said time shift correction to said seismic data traces to form corrected seismic data traces.

44. The digital computer of claim 43 further programmed to perform a process comprising performing at least one of: i) an amplitude variation with azimuth analysis on said corrected seismic data traces and ii) a velocity variation with azimuth analysis on said corrected seismic data traces.

45. The digital computer of claim 43 further programmed to perform a process comprising performing an amplitude variation with incidence angle analysis on said corrected seismic data traces.

46. The digital computer of claim 43 further programmed to perform a process comprising determining a surface consistent statics correction for said seismic data traces.

47. A system for processing seismic data obtained over a region of the earth's subsurface comprising:
(a) storage media for storing a gather of seismic data traces; and
(b) a process for cross-correlating seismic data traces included in said gather within a time window to estimate a time shift in the seismic data traces resulting from velocity anisotropy in the earth's subsurface.

48. The system of claim 47 wherein the estimated time shift of said seismic data traces is utilized to calculate at least one of: i) an amplitude variation with azimuth value in seismic data traces included in said gather and ii) a velocity variation with azimuth value an seismic data traces included in said gather.

49. The system of claim 48 wherein utilizing the estimated time shift further comprises a least squares analysis process.

50. The system of claim 47 wherein the time shift of said seismic data traces is utilized to calculate an amplitude variation with incidence angle value in seismic data traces included in said gather.

51. The system of claim 50 wherein utilizing the estimated time shift further comprises a least squares analysis process.

52. The system of claim 47 further comprising determining an amplitude variation with azimuth value utilizing the estimated time shift, reflection coefficient, source-receiver azimuth angle and incidence angle data for seismic data traces included in said gather.

53. The system of claim 47 wherein cross-correlating said seismic data traces further comprises cross-correlating said seismic data traces with a pilot trace composited from a plurality of traces of said seismic data gather.

54. The system of claim 53 wherein the pilot trace further comprises a plurality of traces composited from within a predetermined spatial window within said gather of seismic traces.

55. The system of claim 55 wherein the estimated time shift in said seismic data traces is utilized for determining a time shift correction for said seismic data traces included in said gather.

56. The system of claim 55 further comprising applying said time shift correction to said seismic data traces to form corrected seismic data traces.

57. A method for processing seismic data to estimate a time shift resulting from velocity anisotropy in the earth's subsurface, comprising:

(a) forming a gather of seismic data traces;

(b) cross-correlating seismic data traces included in said gather within a time window to estimate a time shift in the seismic data traces resulting from velocity anisotropy in the earth's subsurface; and (c) calculating, with the estimated time shift in the seismic data traces, at least one of i) an amplitude variation with incidence angle, ii) an amplitude variation with azimuth, and iii) a velocity variation with azimuth for the seismic traces.

58. The method of claim 57 wherein said seismic data traces are cross-correlated with a pilot trace composited from a plurality of traces within a predetermined spatial window.

59. The method of claim 57 further comprising determining an anisotropy time-shift correction from the estimated time shift.

60. The method of claim 59 wherein the anisotropy time shift correction is applied to the seismic data traces.

61. The method of claim 57 further comprising determining a surface consistent statics correction for the seismic data traces.

* * * * *

UNITED STATES PATENT AND TRADEMARK OFFICE
CERTIFICATE OF CORRECTION

PATENT NO. : 6,898,147 B2
APPLICATION NO. : 10/689423
DATED : May 24, 2005
INVENTOR(S) : Edward Louis Jenner and Martin Carroll Williams It is certified that error appears in the above-identified patent and that said Letters Patent is hereby corrected as shown below:

*Column 3, line 28, please change: "FIG. after" to --FIG. 2A after--*

*Column 7, line 30, please change equation to:* --
$$\delta^{(v)} = \frac{(C_{1133} - C_{3232})^2 - (C_{3333} - C_{3232})^2}{2C_{3333}(C_{3333} - C_{3232})^2}$$
--

*Column 7, line 49, Eq. (7), please change to:*
$$--R(\theta, \phi) = I + [G_2 * Cos^2(\phi - \beta) + G_1 * Sin^2(\phi - \beta)]Sin^2(\theta)--$$

*Column 7, line 53, Eq. (8), please change to:*
$$--G_2 * \cos^2(\phi - \beta) + G_1 * \sin^2(\phi - \beta) = W_{11}\cos^2(\phi) + 2W_{12}\cos(\phi)\sin(\phi) + W_{22}\sin^2(\phi)--$$

*Column 7, line 55, please change:*
"$W_{11}$, $W_{12}$, and $W_{13}$" to --$W_{11}$, $W_{12}$, and $W_{22}$--

*Column 7, line 59, Eq. (9), please change to:*
$$-- G_2^* = 0.5(W_{11} + W_{22} + \sqrt{(W_{11} - W_{22})^2 + 4W_{12}^2}) --$$

*Column 7, line 61, Eq. (10), please change to:*
$$-- G_1^* = 0.5(W_{11} + W_{22} - \sqrt{(W_{11} - W_{22})^2 + 4W_{12}^2}) --$$

*Column 8, line 7, Eq. (13), please change to:*
$$-- G_1 = 0.5(W_{11} + W_{22} - \sqrt{(W_{11} - W_{22})^2 + 4W_{12}^2}) --$$

UNITED STATES PATENT AND TRADEMARK OFFICE
CERTIFICATE OF CORRECTION

PATENT NO. : 6,898,147 B2
APPLICATION NO. : 10/689423
DATED : May 24, 2005
INVENTOR(S) : Edward Louis Jenner and Martin Carroll Williams It is certified that error appears in the above-identified patent and that said Letters Patent is hereby corrected as shown below:

*Column 8, line 9, Eq. (14), please change to:*

-- $G_2 = \sqrt{(W_{11} - W_{22})^2 + 4W_{12}^2}$ --

Signed and Sealed this

Twenty-ninth Day of April, 2008

JON W. DUDAS
*Director of the United States Patent and Trademark Office*